Figure 15:
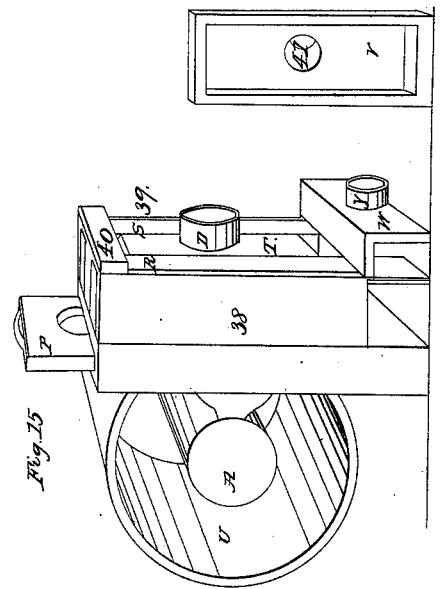
Figure 17:
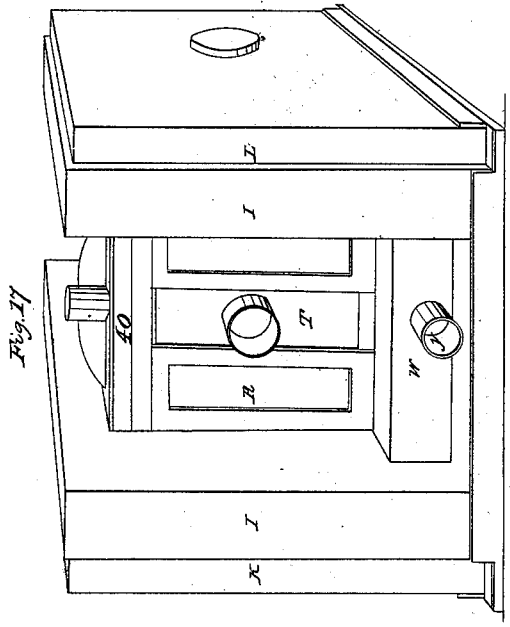
Figure 14:
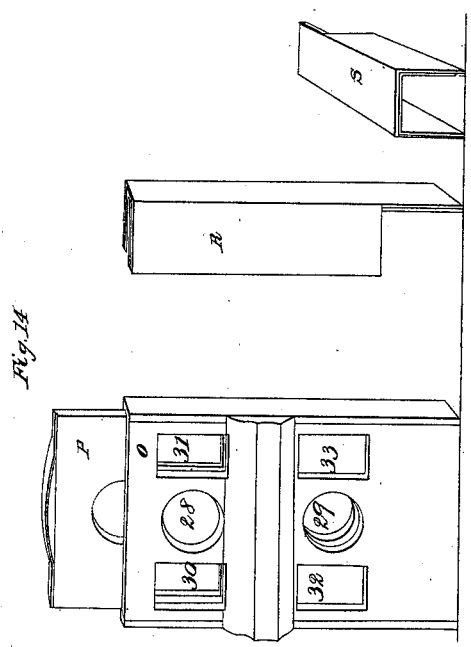
Figure 16:
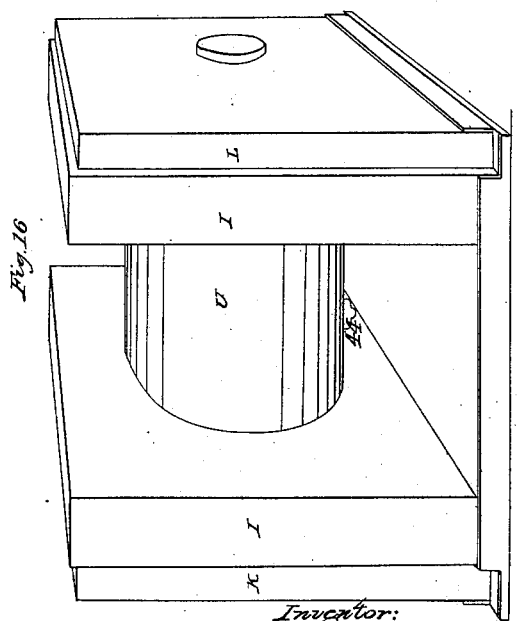

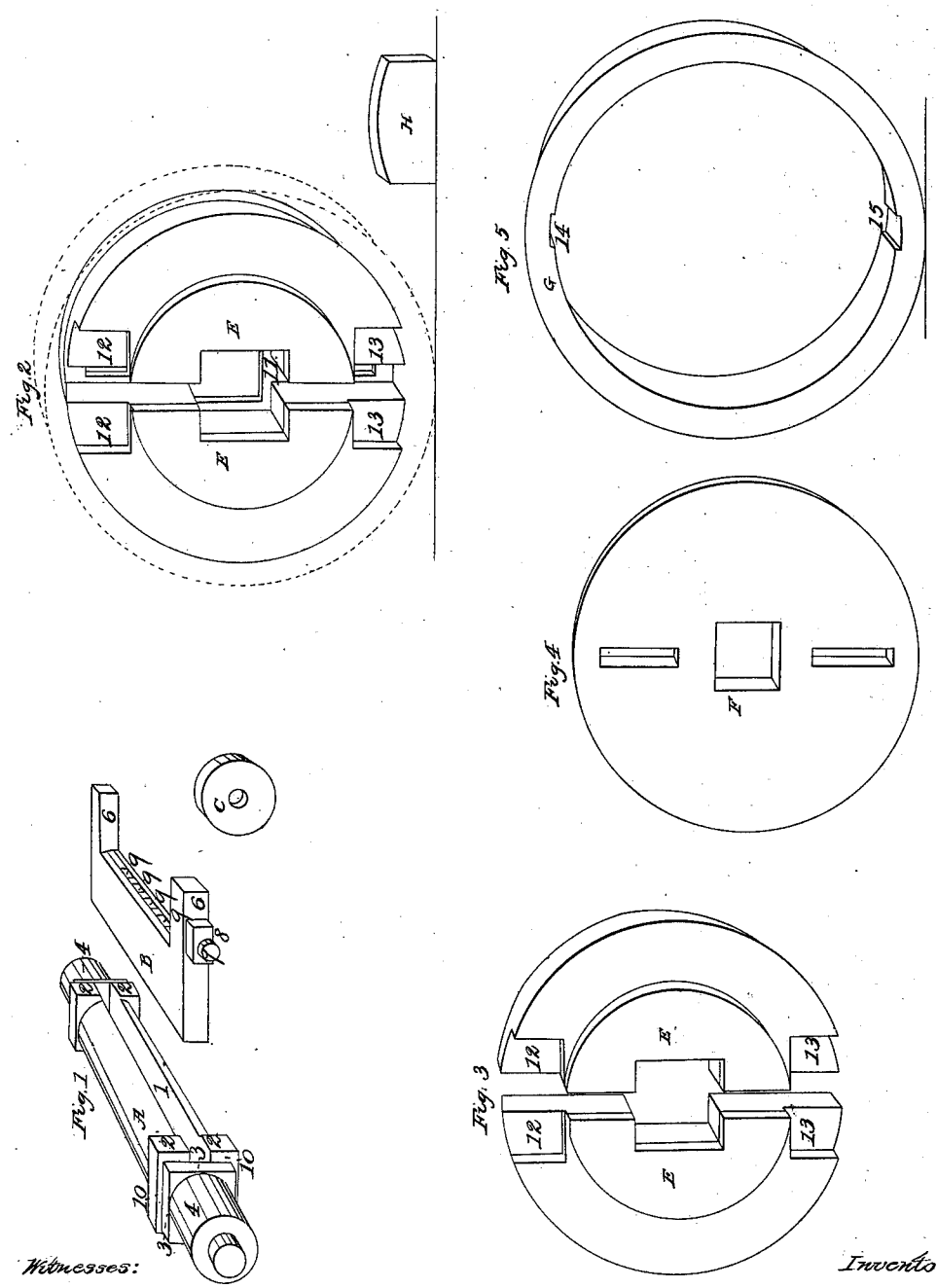

E. W. Jackson,
Rotary Steam Engine.
N° 80,487. Patented July 28, 1868.
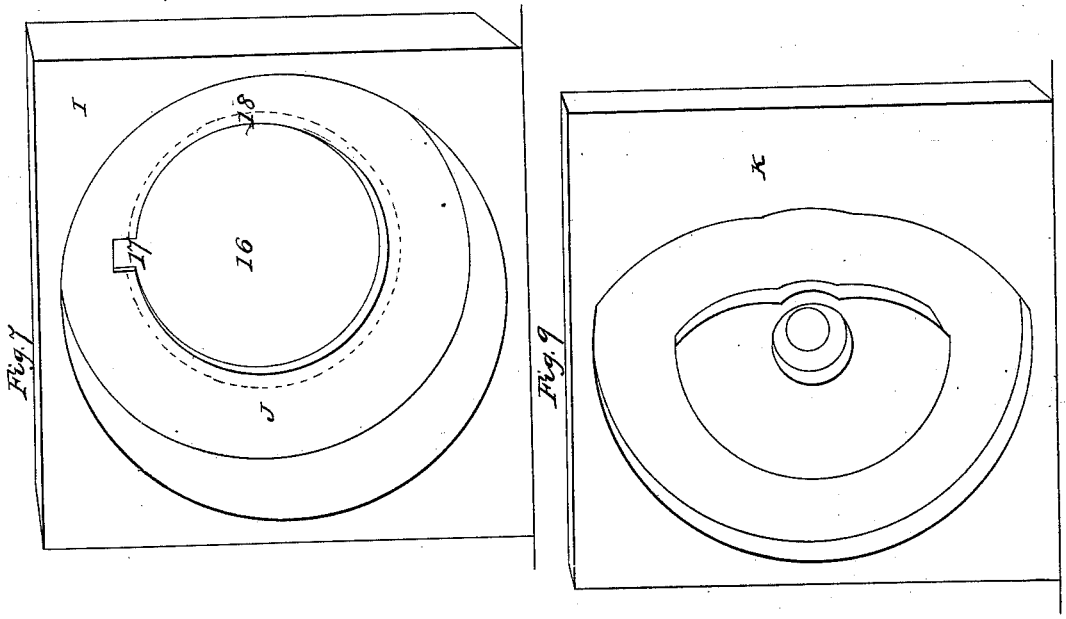
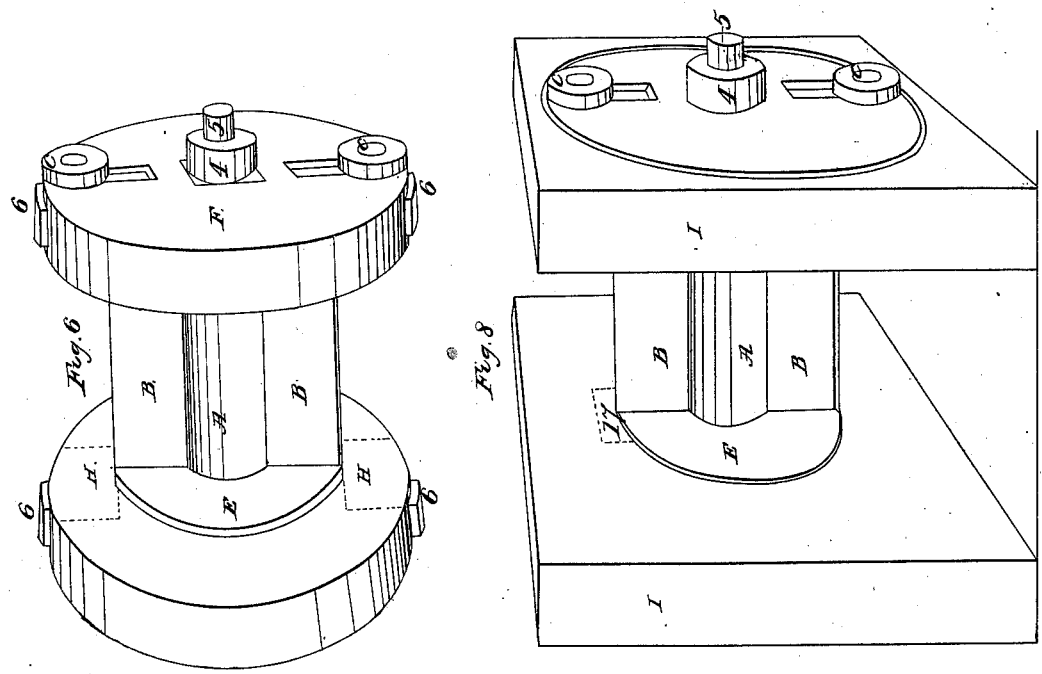
Witnesses:
J. C. Wildman
Edwin J. McLean
Edwin W. Jackson
per Th. Kenney & Co. attys E. W. Jackson,
Rotary Steam Engine.
Nº 80,487. Patented July 28, 1868.
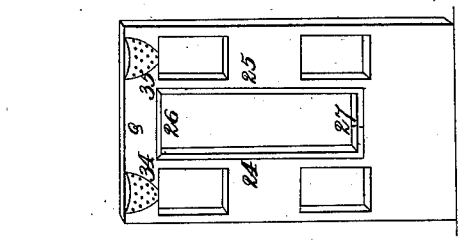
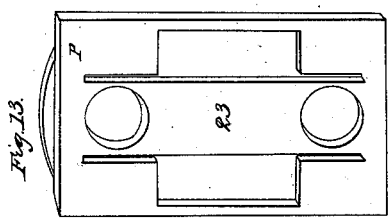
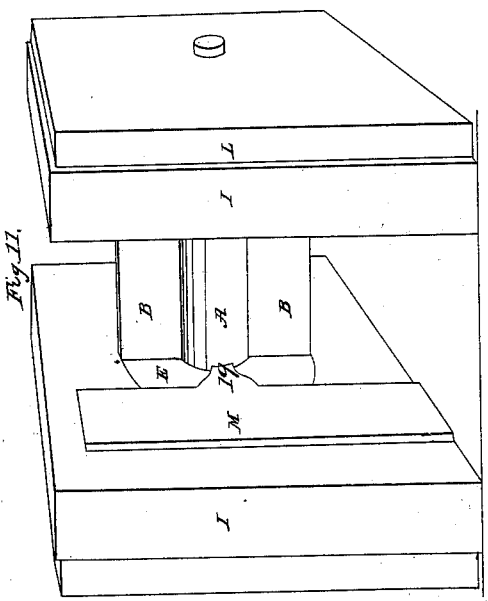
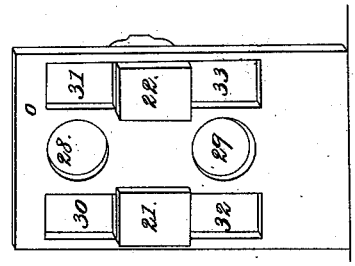
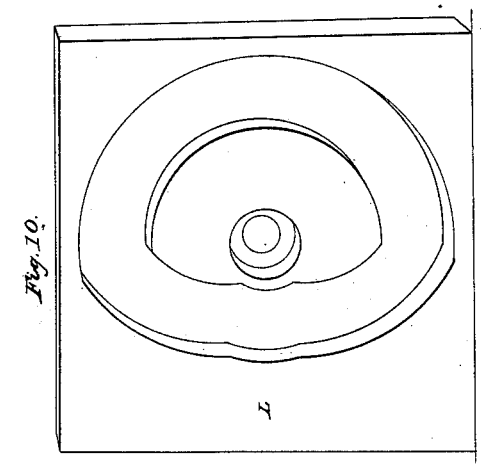
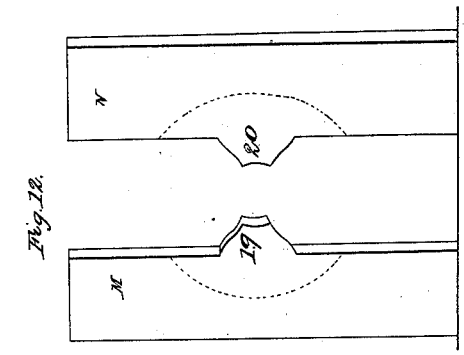
Witnesses:
Inventor:

E. W. Jackson,
Rotary Steam Engine.

Nº 80,487.  Patented July 28, 1868.

Witnesses:

Inventor:
Edwin W Jackson

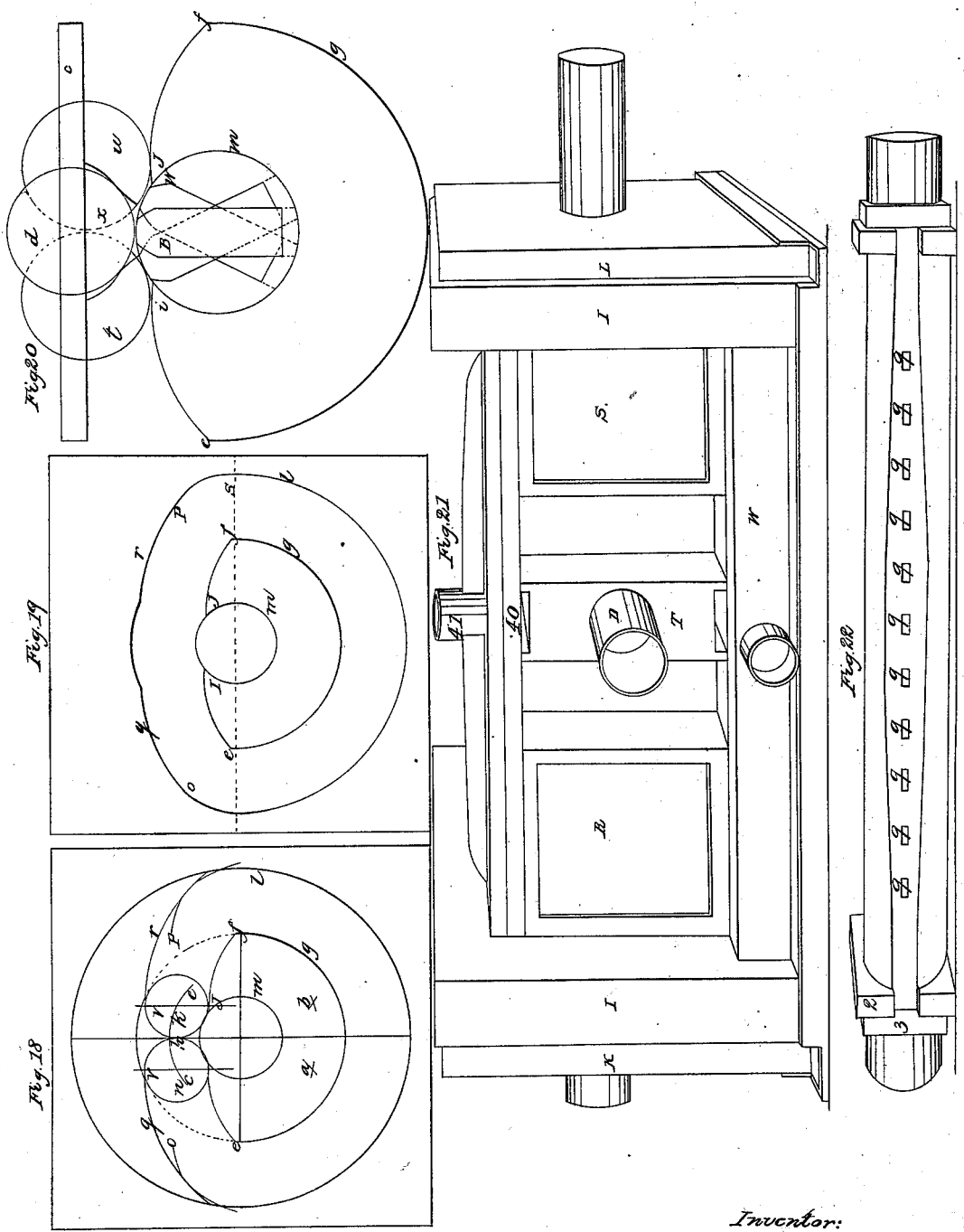

United States Patent Office.

EDWIN W. JACKSON, OF BROOKLYN, NEW YORK.

Letters Patent No. 80,487, dated July 28, 1868.

---

IMPROVEMENT IN ROTARY STEAM-ENGINES.

---

The Schedule referred to in these Letters Patent and making part of the same.

---

TO ALL WHOM IT MAY CONCERN:

Be it known that I, EDWIN W. JACKSON, of Brooklyn, in the county of Kings, Long Island, and State of New York, have invented a new and useful Steam Rotary Motive-Power; and I do hereby declare that the following is a full, clear, and exact description thereof.

My invention relates to that class of machinery which is to be used wherever steam is the propelling power of vessels, railroad-trains, and all kinds of machinery for manufacturing purposes, where a steam-cylinder is required.

To enable others skilled in the art to make and use my invention, I will proceed to describe its construction and operation, reference being had to the annexed drawings, making a part of this specification, in which—

A, Plate I, gives a perspective view of the main shaft, having an opening, from side to side, as at Figure 1, in which the pistons slide.

Figures 2 and 3 form the centre-pieces for the end wheels.

Figure 4 is that part of the main shaft which revolves in the governors' guides.

Figure 5 revolves in the front plate of the governors' guides.

B, a view of one of the two pistons.

Figure 6, the projections to which the axles of the governors are attached.

7, the governor's axle.

8, block placed at the back.

9 represents holes which pass completely through the pistons, to allow the steam to escape when one piston is closing on to the other, and also to admit the steam when one piston is drawing off from the other.

C, a view of one of the four governors. Caps should be placed on the ends of the axles, after the governors are put on, to keep them in their places; also washers should be placed, one on each side, for the governors to play against.

Plate II gives a view of one of the end wheels. These wheels should be passed over the ends of the main shaft, back first, so that the shoulder marked 11 will meet the shoulder marked 10 on the main shaft. The two end wheels are formed exactly alike, and one pattern is all that is required for the casting of both. They revolve with the main shaft, to which they should be firmly united, and, if possible, cast in one mass with the same. The circular projecting parts, marked E, revolve in the back plates to frames or covers of the end wheels, as will be hereafter explained. The end wheels can be made of any desired strength by placing thick bands around their peripheries, or the same can be cast in one with the wheels. The dotted circular lines represent this band, as also shown in Plate V. In order to render this explanation more lucid, the end wheel is given in parts in Plates III and IV.

H represents one of the plates to be placed at 12 and 13, where they should be closely fitted, the face meeting that of the wheel. At the back of these pieces, the projections of the pistons slide, as the latter pass in and out of the main shaft, as the pistons, with their projections, could not be placed in the end wheels without the spaces at 12 and 13 are open. The plates marked H should be riveted on after the end wheels, pistons, &c., are put together.

Plate III, a view of the end wheel without the front plate.

Plate IV, view of the front plate F, upon which the two halves are to be placed, as shown in Plate III. They should be firmly united.

Plate V. G, view of the band, which should be placed (when great strength is required) around the end wheels, but if the latter can be cast in one with the main shaft, there will be sufficient strength without the additional band. The small indentures at 14 and 15 are made for the ends of the projections of the pistons to play when they are drawn out to their full extent.

Plate VI, a view of a combination of the parts shown in the former plates, consisting of main shaft, pistons, governors, and end wheels, being the whole of the revolving or movable parts in this machine. A, main shaft;

B, pistons; C, governors; 6, projections of pistons; E, circular projections, which revolve in back plates of the covers to end wheels, the covers being permanent fixtures; the dotted lines represent the small plates, H, placed in their sockets; F, front plate to end wheels.

Plate VII. I, view of one of the covers of the end wheels. 16, the circular space in the front plate J, which encloses the circular projections E. The latter revolves in the former, and should be packed, as the piston in the common steam-cylinder. 17 is where a piece should be cut out, for the purpose of allowing the covers to pass over the projections of the pistons, as the latter must first be placed in the main shaft. A piece, afterwards, should be put in, as at H, on the end wheels, explained in Plate II. A circular piece of packing should be placed on the inside or back of the front plate J, as represented by the dotted circular line, 18, and should continue to the edge of the circular space, 16. This packing will prevent the end wheels grinding against the plate J, and also prevent the steam from passing between the plate and the end wheels. The plate J can be made of any desired thickness for strength, and the circular projections E on the end wheels made to correspond.

Plate VIII, combined view of the former parts. I, covers to end wheels; 17, place where a piece is set in, as shown in Plate VII; E, circular projections on end wheels, B, pistons; A, main shaft; C, governors; 4 and 5, that part of the main shaft which revolves in governors' guides. The covers to the end wheels are formed exactly alike, and can be cast from one pattern.

Plate IX. K, a view of the first governor's guide, in which the governors traverse.

Plate X. L, a view of the second governor's guide. It will be seen that the governors' guides, K and L, cannot be cast from one pattern. They must be placed facing each other, so that those sides containing the perfect half circle will be on the same side of the machine as the cylinder.

Plate XI, a view of K and L, the governors' guides, as attached to the other machinery. M, one of the plates, as represented in Plate XII. The plate N lies opposite that of M. It will be noticed that, for all practical purposes, it would not be necessary for the bearing of the main shaft to be put upon the governors' guides, consequently no encroachment need be made on the main shaft.

Plate XII, view of the plates M and N. They should be firmly attached to the back plates of the covers to the end wheels, one to each plate, and placed so that the projecting parts, 19 and 20, will meet the main shaft. To these projecting parts the bar of separation is to be united, (one of the former to each end of the latter,) so that they become a continuation of the bar of separation. The dotted lines show where the plates M and N lie against the face of the circular projections E, which are attached to the end wheels. The backs of plates M and N should be packed where the circular projections E play against them.

Plate XIII, view of the plates O, P, and Q. All the required changes, in opening and closing the steam-ports, and the doors of the condensers to correspond, are effected by raising or lowering a single plate, which is brought into operation only when a change, either from a forward or backward movement, is required. 28, upper steam-port; 29, lower steam-port; 30 and 31, upper doors to condensers; 32 and 33, lower doors to condensers; 34 and 35, circular plates, perforated for the purpose of dispersing cold water in small streams over the inside walls of the condensers; O, the back plate, to which the bar of separation is attached, and also the front edges of the cylinder. On the face of this plate the sliding plate P plays. The centre piece, 23, having the circular doors, plays between the projecting blocks, 21 and 22.

The plate Q should be placed outside the sliding plate P, so that the latter plate plays between the two former, and the doors to the condensers, in both plates O and Q, lie opposite to each other. The oblong open space, in plate Q, must have a projecting box over it, the bottom edge of which must be attached to the plate Q at 24, 25, 26, and 27. This box forms a steam-chest, receiving the steam through a leader from the boiler, as hereafter will be shown. At the bottom of this steam-chest, the centre-piece, 23, of the sliding plate P plays, opening and shutting the steam-ports, as may be required. The three plates, O, P, and Q, here represented, are so constructed that, by simply raising or lowering the sliding plate P, the desired changes are produced.

It can easily be seen by these drawings that if the sliding plate P (here represented as raised) is passed on a horizontal line over the face of the plate O, the upper steam-port will be closed, and the upper doors of the condensers thrown open, and at the same time the lower steam-port will be open and the lower doors of the condensers closed. When the sliding plate P is lowered, the upper steam-port is thrown open, and the upper doors of the condensers closed, and at the same time the lower steam-port is closed, and the lower doors of the condensers are thrown open.

Plate XIV, view of the three plates O, P, and Q, represented in Plate XIII, given in their proper positions. The sliding plate P being raised, the upper steam-port is closed, and the upper doors of condensers open, lower steam-ports open, and lower doors of condensers closed.

This drawing gives a back view, showing the bar of separation, and how attached to the back plate O. The front and back plates, O and Q, are bound in their places by two extra plates, firmly attached, one on each side, as at 36 and 37. R represents one of the condensers, having both inside and outside walls, for the purpose of allowing a narrow sheet of cold water to pass between the walls, thus making a surface-condenser of the inside wall, the latter at the same time having small streams of water cast over its surface from the circular plates, 34 and 35. S is an end view of the other condenser, showing more distinctly the inside and outside plates. The outside plates must have caps over them, having holes sufficiently large to supply with water the circular plates, 34 and 35. The space between the inside and outside walls of these condensers must be left at top so that the condensing-water may pass between them at the same time the circular perforated plates are supplied.

Plate XV, view of the two condensers, R and S, in their proper positions, one on each side of the steam-chest T. D, the main steam-port, to which a leader or steam-pipe from the boiler should be attached. The main shaft A is here represented as its surface rests against the face of the bar of separation X. The cylinder surface of the cylinder should be attained by striking a circle (the pistons being first drawn out) which will touch the corners of their flat surfaces.

Plate XXI, a view of the rotary motor, of suitable length for the diameter of the cylinder. It would seldom become necessary to make the cylinder less in length than three times its diameter, but in many cases more; for instance, when attached to a locomotive for railroad purposes, where the axles of the wheels should become the main shaft of the rotary, in which case length of cylinder would be more desirable than an increase of diameter. The dimensions here given are very small. The length of cylinder would be nine and three-fourths inches, and the diameter three and one-fourth inches, with length of piston to correspond. The latter draws out from the main shaft one inch, giving a surface of nine and three-fourths square inches for the steam to act against, being a greater surface of piston than any other steam-cylinder of its size and of the same proportions.

The common steam-cylinder requires to be filled twice with steam to cause one revolution of the paddle-wheels, while this rotary motor will give a revolution with less steam than will fill the common steam-cylinder once. This rotary should be constructed on the main shaft of a vessel where paddle-wheels are used, and its front, or that side containing the condensers, placed towards the bow. When thus placed, and the vessel going forward, the pistons will draw out from the main shaft and run in again with but very little aid from the steam, their specific gravity doing nearly all.

As there is no shifting of valves in this rotary motor, except when a change is required from either a forward or a backward movement, a vessel may be propelled, through the medium of this rotary, across the Atlantic, without shifting a valve. The strain on the main shaft of a vessel using this rotary would be small and uniform, and the hull more durable.

Plate XXII, a view of the piston, as it lies in the main shaft, showing the form it should have when a lengthy piston is required. It should swell in the middle, and taper down to its proper thickness at the ends, thus preventing any liability of its bending under the pressure of steam. The front edge or face of the piston should retain its form, as hereafter given, that it may pass the bar of separation freely.

*Rules and Proportions.*

If the given diameter of the main shaft is two and one-half feet, the diameter of the cylinder inside would be six and one-half feet, and the diameter of the outer boundary line of governors ten and one-half feet; diameter of governors, two feet, and thickness six inches; diameter of axles to governors, six inches; pistons, from top to bottom, previous to their faces being cut down, two and one-fourth feet; thickness of pistons, nine inches; flat surface, on face of pistons, measuring crossways, four and one-half inches; rise and fall of pistons, two feet; width of bar of separation on the face, measuring crossways, nine inches.

These proportions should be very accurately observed, in order to have the machinery run free. The peripheries of the governors, when on their axles, and the pistons sunk into the main shaft, should meet on a direct line with the surface of the latter. The proportions are here given, without allowance being made for packing. Great accuracy is required in the formation of the pistons. All that portion lying between the end wheels, being in length equal to the extent of the cylinder, should be rounded off on their faces to the same curve as that of the main shaft, after which, the bottom of the pistons should be cut away (taking in their extreme length) until they measure in height equal to nine-tenths the diameter of the main shaft, after which, the faces of the pistons should be shaved down in a direct line, leaving a flat surface, measuring crossways equal to half their thickness. In cutting down the faces of the pistons and tapering off their sides, care should be taken not to encroach upon the ends lying beyond the faces of the end wheels. These ends should be nicely rounded off, to meet the inside curve of the cylinder when the pistons are raised.

The above proportions are susceptible of change.

What I claim as my invention, and desire to secure by Letters Patent, is—

The combination of the steam-chest T, (Plate XVII,) changeable steam-ports, (Plates XIII and XIV,) main shaft, (Plate I, fig. A;) the shifting pistons, perforated completely through, (Plate I, B,) they having projections or shafts on their ends, to which the four rollers, C C, (Plate VI,) are attached, one on each end; two end-pieces, called governors' guides, (Plates IX and X,) which are placed, one at each end of the pistons; thick bar, described as the bar of separation, (Plate XV, x,) placed between the upper and lower steam-ports, and back plate O, (Plate XIII,) to which the bar of separation is attached, substantially as and for the purpose set forth.

EDWIN W. JACKSON.

Witnesses:
Jno. Johnson,
H. C. McKenney.